United States Patent [19]

Uchida et al.

[11] Patent Number: 5,357,014

[45] Date of Patent: Oct. 18, 1994

[54] STYRENIC RESIN MOLDING AND PROCESS FOR PRODUCING SAME

[75] Inventors: Takaaki Uchida; Tomoaki Takebe; Keisuke Funaki, all of Ichihara; Komei Yamasaki, Sodegaura, all of Japan

[73] Assignee: Idemitsu Kosan Co., Ltd., Tokyo, Japan

[21] Appl. No.: 923,475

[22] Filed: Aug. 3, 1992

[30] Foreign Application Priority Data

Aug. 9, 1991 [JP] Japan .................................. 3-200401
Oct. 15, 1991 [JP] Japan .................................. 3-266419

[51] Int. Cl.$^5$ ........................... C08F 12/00; C08J 5/18
[52] U.S. Cl. .................... 526/347.2; 526/346; 528/481; 528/503; 428/220; 264/291; 264/292; 264/331.17; 264/345
[58] Field of Search ............ 526/347.2, 348.1; 528/481, 502, 503; 428/220; 264/164, 291, 292, 331.17, 345

[56] References Cited

U.S. PATENT DOCUMENTS

4,824,629  4/1989  Seitz et al. .
4,959,435  9/1990  Seitz et al. ................. 526/348.1 X

FOREIGN PATENT DOCUMENTS

0318794  6/1988  European Pat. Off. .
0325125  7/1989  European Pat. Off. .

OTHER PUBLICATIONS

Database WPIL, Week 8823, Derwent Publications Ltd., AN 88-158202, JP-A-63 098 431, Apr. 28, 1988, "Moulding Styrenic Polymer Providing High Heat-Resistance—Involves Heat-Treating Non-Crystalline Styrenic Polymer Moulding Having Syndiotactic Structure".

Database WPIL, Week 8949, Derwent Publications Ltd., AN 89-361739, JP-A-1 272 608, Oct. 31, 1989, "Syndiotactic Polystyrene Alpha-Crystalline Structure—Is Prepared by Melting Starting Polymer, Cooling and Heating Solidified Polymer to Crystallise".

*Primary Examiner*—Fred Teskin
*Attorney, Agent, or Firm*—Oblon, Spivak, McClelland, Maier & Neustadt

[57] ABSTRACT

There are disclosed a styrenic resin molding having a high crystallinity and excellent in heat resistance, solvent resistance and transparency, and a process for producing the same. Specifically the present invention provides an orientable or thermoformable non-oriented styrenic resin molding having a crystallinity of 25% or more, a spherulite radius of 10 μm or less and a haze of 5% or less and comprising a styrenic polymer having a high degree of syndiotactic configuration; a process for producing the above non-oriented molding; a transparent styrenic-resin molding having a crystallinity of 30% or more which is obtained by thermoforming or orienting the above non-oriented molding at an expansion ratio by area of 1.2 or more; and the process for producing the same. The styrenic resin molding of the present invention can be effectively utilized as heat-resisting transparent sheet, medical treatment container, microwave-range container, food package container such as hot packing container, oven container, retort container, etc., and heat-resisting transparent container such as heat-resisting bottle.

6 Claims, No Drawings

STYRENIC RESIN MOLDING AND PROCESS FOR PRODUCING SAME

BACKGROUND OF THE INVENTION

1. Field of the Invention

The present invention relates to a styrenic resin molding and a process for producing the same. More particularly, it pertains to a styrenic resin molding having a high crystallinity and excellent in heat resistance, solvent resistance and transparency, and a process for efficiently producing the same.

2. Description of Related Art

There has heretofore been increasingly desired a container endowed with all of heat resistance, oil resistance and transparency mainly as an alternative to a glass container. As a general rule a container made of polyethylene terephthalate, polypropyrene, polyethylene, polystyrene or the like each being a thermoformed molding has been insufficient in heat resistance, thus failing to meet the above-mentioned desire.

On the other hand, a styrenic polymer having syndiotactic configuration is known to be high in heat and solvent resistances and is expected to find a variety of applications. In order to make full use of the characteristics of the aforestated styrenic polymer, however, it is necessary that the molding made of the styrenic polymer be provided with a sufficiently high crystallinity. Nevertheless, the molding of a syndiotactic styrenic polymer crystallized by the conventional method is known to be low in transparency.

As an example of molding having transparency which is made of a styrenic polymer having syndiotactic configuration, there are known a sheet with a low crystallinity and a film with refined crystal by means of orientation (refer to Japanese Patent Application Laid-Open Nos. 168709/1989 and 316246/1989). However, the sheet with a low crystallinity is insufficient in heat and solvent resistances, and although it can be thermoformed, the end thereof is apt to whiten, thus making it difficult to produce a wholly transparent container. In addition in spite of its extremely excellent properties, the aforesaid oriented film is expensive because of the costly orientation equipment to be used therefor; besides in the case of producing a thick oriented film, it is necessary to increase the thickness of the original sheet with a low crystallinity before orientation, thus making it difficult to produce a molding having a thickness of 300 μm or more. Moreover, the highly transparent oriented film is insufficient in thermoformability.

There is also known a method for heat-treating a styrenic polymer having a low crystallinity (Japanese Patent Application Laid-Open No. 272608/1989), which method however, has not necessarily been successful in forming a transparent and crystallized molding.

In view of the aforestated circumstances facing such difficulty, in order to develop a highly crystallized and transparent molding capable of coping with the requirement of a wide range of thickness, especially a thickness of 300 μm or more, intensive research and investigation were made by the present inventors on a method for controlling the growth of both the positively birefringent crystal in the primary crystallization and the negatively birefringent crystal in the secondary crystallization, thus suppressing light scattering. As a result it has been discovered that a highly transparent thermoformable or orientable non-oriented molding having a high crystallinity can be efficiently produced by subjecting a preform for heat treatment having a crystallinity of 20% or less which comprises as the principal component a styrenic polymer having syndiotactic configuration to high-speed heating and heat treatment within a definite temperature range and that the objective molding further excellent in transparency can be efficiently produced by subjecting the non-oriented molding thus obtained to thermoforming and orientation treatment, which molding being exemplified by wholly transparent and heat-resisting containers, transparent and heat-resisting sheets having a thickness of 300 μm or more, etc. The present invention has been accomplished on the basis of the above-described finding and information.

SUMMARY OF THE INVENTION

Specifically the first aspect of the present invention provides an orientable or thermoformable non-oriented styrenic resin molding characterized in that the molding comprises a styrenic polymer having a high degree of syndiotactic configuration (hereinafter sometimes referred to as "SPS") or a composition thereof and has a crystallinity of 25% or more, a spherulite radius of 10 μm or less and a haze of 5% or less. In addition, the second aspect of the present invention provides a process for producing the above-mentioned non-oriented styrenic resin molding which comprises subjecting a preform for heat treatment having a crystallinity of 20% or less and comprising SPS or a composition thereof to high-speed heating followed by heat treatment at a temperature in the range of 140° C. to 180° C. Moreover, the third aspect of the present invention provides a transparent styrenic resin molding having a crystallinity of 30% or more which is obtained by thermoforming or orienting the aforestated non-oriented styrenic resin molding at an expansion ratio by area of 1.2 or more. Furthermore, the fourth aspect of the present invention provides a process for producing a transparent styrenic resin molding having a crystallinity of 30% or more which comprises subjecting the aforestated non-oriented styrenic resin molding to thermoforming or orientation at an expansion ratio by area of 1.2 or more and at 120° to 260° C.

DESCRIPTION OF PREFERRED EMBODIMENT

The styrenic polymer to be used as the raw material for molding in the present invention has a high degree of syndiotactic configuration.

Here, the styrenic polymer which has a high degree of syndiotactic configuration means that its stereochemical structure is of high degree of syndiotactic configuration, i,e. the stereostructure in which phenyl groups or substituted phenyl groups as side chains are located alternately at opposite directions relative to the main chain consisting of carbon-carbon bonds. The tacticity thereof is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The SPS as mentioned in the present invention usually means polystyrene, poly(alkylstyrene), poly(- halogenated styrene), poly(alkoxystyrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene). Poly(halogenated styrene) includes poly(chlorostyrene), poly(bromostyrene), and poly(fluorostyrene). Poly(alkoxystyrene) includes poly(methoxystyrene), and poly(ethoxystyrene).

Particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The molecular weight of the styrenic polymer having a high degree of syndiotactic configuration (SPS) to be used in the present invention is not specifically limited, but is desirably 10,000 or more, particularly desirably 50,000 or more in terms of weight-average molecular weight. The molecular-weight distribution, that is, the broadening of the molecular weight of SPS is not specifically limited as well, but may be in a wide range. Having a melting point of 200° to 300° C., the SPS is surpassingly superior in heat resistance to the conventional styrenic polymer having atactic configuration.

Such SPS can be produced by polymerizing a styrenic monomer which corresponds to the SPS in the presence or absence of a solvent such as an inert hydrocarbon by the use of a catalyst comprising a titanium compound and a condensation product of water and a trialkylaluminum.

The molding according to the present invention can be obtained by molding the above-described SPS as the raw material, and may be incorporated with a generally used additive such as a thermoplastic resin, rubber, an antioxidant, an inorganic filler, a crosslinking agent, a crosslinking aid, a nucleating agent, a plasticizer, a compatibilizing agent, a colorant, an antistatic or the like to form a composition to the extent that the object of the present invention is not impaired thereby.

Examples of the aforementioned thermoplastic resin include styrenic polymer such as atactic polystyrene, isotactic polystyrene, AS (acrylonitrile-styrene) resin and ABS (acrylonitrile-butadiene-styrene) resin; polyester such as polyethylene terephthalate; polyether such as polycarbonate, polyphenylene oxide, polysulfone and polyether sulfone; condensation type polymer such as polyamide, polyphenylene sulfide (PPS) and polyoxymethylene; acrylic polymer such as polyacrylic acid, polyacrylic acid ester and polymethyl methacrylate; polyolefin such as polyethylene, polypropylene, polybutene, poly-4-methylpentene-1 and ethylene/propylene copolymer; halogenated vinyl compound polymer such as polyvinyl chloride, polyvinylidene chloride and polyvinylidene fluoride; and mixtures thereof.

There are available a variety of rubbers, of which is most suitable a rubbery copolymer comprising a styrenic compound as one of the components. Examples thereof include styrene/butadine block copolymer rubber in which the butadiene segment is partially or totally hydrogenated (SEBS), styrene/butadiene copolymer rubber (SBR), methyl acrylate/butadiene/styrene copolymer rubber, acrylonitrile/butadiene/styrene copolymer rubber (ABS rubber), acrylonitrile/alkyl acrylate/butadiene/styrene copolymer rubber (AABS), methyl methacrylate/alkyl acrylate/styrene copolymer rubber (MAS), methyl methacrylate/alkyl acrylate/butadiene/styrene copolymer rubber (MABS) and mixtures thereof. The rubbery copolymer comprising a styrenic compound as one of the components has favorable dispersibility in a styrenic polymer having a high degree of syndiotactic configuration because of its having a styrenic unit and as a result is markedly improved in physical properties.

Other examples of usable rubbers in addition to the foregoing include natural rubber, polybutadiene, polyisoprene, polyisobutylene, neoprene, ethylene/propylene copolymer rubber, polysulfide rubber, thiokol rubber, acrylic rubber, urethane rubber, silicone rubber, epichlorohydrin rubber, polyether-ester rubber, polyester ester rubber and mixtures thereof.

There are available a variety of antioxidants, of which are preferable phosphorus-based antioxidants including mono/di-phosphite such as tris(2,4-di-tert-butylphenyl) phosphite, tris(mono/di-nonylphenyl)-phosphite and phenolic antioxidant.

The preferably usable diphosphites include the phosphorus-based compound represented by the general formula

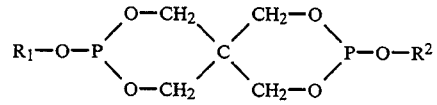

wherein $R^1$ and $R^2$ are each independently an alkyl group having 1 to 20 carbon atoms, a cycloalkyl group having 3 to 20 carbon atoms or an aryl group having 6 to 20 carbon atoms.

Specific examples of the phosphorus-based compound represented by the above-mentioned general formula include distearyl pentaerythritol diphosphite, dioctyl pentaerythritol diphosphite, diphenyl pentaerythritol diphosphite, bis(2,4-di-tert-butylphenyl) pentaerythritol diphosphite, bis(2,6-di-tert-butyl-4-methylphenyl) pentaerythritol diphosphite and dicyclohexyl pentaerythritol diphosphite.

The known phenolic antioxidants may be used and are specifically enumerated by 2,6-di-tert-butyl-4-methylphenol; 2,6-diphenyl-4-methoxyphenol; 2,2'-methylenebis(6-tert-butyl4-methylphenol); 2,2'-methylenebis[4-methyl-6-(αmethylcyclohexyl)phenol]; 1-1-bis(5-tert-butyl-4-hydroxy-2methylphenyl)butane; 2,2'-methylenebis(4-methyl-6cyclohexylphenol); 2,2'-methylenebis-(4-methyl-6-nonylphenol; 1,1,3-tris-(5-tert-butyl-4-hydroxy-2-methylphenyl)butane; 2,2-bis-(5-tert-butyl-4-hydroxy-2-methylphenyl)-4-n-dodecylmercaptobutane; ethyleneglycol-bis[3,3-bis(3-tert-butyl -4-hydroxyphenyl)butyrate]; 1-1-bis(3,5-dimethyl-2-hydroxyphenyl) -3-(n-dodecylthio)-butane; 4,4'-thiobis(6-tert-butyl -3-methylphenol); 1,3,5-tris(3,5-di-tert-butyl-4-hydroxybenzyl) -2,4,6-trimethylbenzene; 2,2-bis(3,5-di-tert-butyl -4-hydroxybenzyl)dioctadecyl malonate; n-octadecyl-3-(4-hydroxy -3,5-di-tert-butylphenyl)propionate; and tetrakis [methylene(3,5-di-tert-butyl-4-hydroxyhydrocinnamate]methane.

As the antioxidant other than the aforementioned phosphorus-based antioxidants and phenolic antioxidants, there may be used an amine-based antioxidant, a sulfur-based antioxidant or the like alone or in combination with an other antioxidant.

The amount of any of the above-mentioned antioxidants to be employed is usually 0.0001 to 1 part by weight per 100 parts by weight of the above SPS. An amount thereof less than 0.0001 part by weight remarkably lowers the molecular weight of the SPS, whereas that exceeding 1 part by weight adversely affect the mechanical strength of the SPS molding to be produced, each leading to an unfavorable result.

There may be used a wide variety of inorganic fillers, whether in the form of fiber, granule or powder. Examples of the inorganic fiber in the form of fiber include glass fiber, carbon fiber and alumina fiber. On the other hand, examples of the inorganic fiber in the form of granule or powder include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide and metallic powder.

As the crosslinking agent, there may be used a proper amount of a hydroperoxide such as tert-butylhydroperoxide; cumene hydroperoxide; diisopropylbenzene peroxide; 2,5-dimethyl -2,5-dihydroperoxyhexane; and 2,5-dimethyl-2,5-dihydroperoxyhexane-3, an dialkylperoxide, a ketone peroxide, a dialkylperoxide, a peroxyester or the like.

As the crosslinking aid, there may be suitably employed a quinone dioxime such as p-quinone dioxime; and p,p-dibenzoylquinone dioxime, a methacrylate such as polyethylene glycol dimethacrylate, an allyl compound, a maleimide compound or the like.

As described hereinbefore, the styrenic resin molding according to the present invention is produced from the aforestated SPS or the composition of SPS incorporated with a thermoplastic resin, a rubber, an antioxidant, an inorganic filler, a crosslinking agent, a crosslinking aid, a nucleating agent, a plasticizer, a compatibilizing agent, a colorant, an antistatic agent or the like as the raw material. The styrenic resin molding shall have the following physical properties.

The crystallinity of the non-oriented styrenic resin molding of the present invention is 25% or more, preferably 30% or more. A crystallinity thereof less than 25% results in insufficient heat resistance. The haze thereof is 5% or less, preferably 4% or less. A haze thereof exceeding 5% leads to insufficient transparency of the molding. The spherulite radius of the resin as determined by light scattering method is 10 $\mu$m or smaller, preferably 5 $\mu$m or smaller. A spherulite radius thereof exceeding 10 $\mu$m gives rise to insufficient transparency of the molding. By the term "non-oriented" as used herein for the molding is meant an absolute value of birefringence $|\Delta n|$ of $20\times10^{-3}$ or less, preferably $10\times10^{-3}$ or less.

There are available various processes for producing the styrenic resin molding of the present invention, among which mention can be made of the process according to the present invention as the appropriate process. Specifically, a preform (film, sheet or container) for heat treatment having a low crystallinity is formed from the aforestated SPS or the composition of the SPS incorporated as necessary with at least one of the above-described additives by means of preforming. In the preforming, heat-molten raw material for molding may be extruded into a prescribed form. Film and sheet can be produced by T-die molding and the other structure such as container can be formed by injection molding or the like. The usable extruding machines include a single screw extruder and twin screw extruder each with or without a vent. The extrusion condition is not specifically limited but may be suitably selected according to the various situations. The preferable extrusion conditions however, include a temperature at the time of melting ranging from the melting point of the raw material to the temperature 50° C. higher than the degradation temperature of the same; and a shear stress of $5\times10^6$ dyne/cm$^2$ or less and enable the production of a preform for heat treatment minimized in surface roughening.

After the above-mentioned extrusion molding, the preform for heat treatment thus obtained is preferably cooled for solidification by the use of a refrigerant such as gas, liquid or metal. In the case where a metallic roll is used for molding a non-oriented preform for heat treatment by means of sheet forming, the application of an air knife, air chamber, touch roll or electrostatic charging is effective in preventing unevenness in thickness and waviness of the film. The cooling solidification is carried out usually at a temperature ranging from 0° C. to the temperature 30° C. higher than the glass transition temperature of the preform for heat treatment, preferably ranging from temperature 70° C. lower than the above glass transition temperature to the above glass transition temperature. The cooling rate is not specifically limited, but is usually selected in the range of 200 ° to 3° C. per second, preferably 200 ° to 10° C. per second.

The preform for heat treatment may be in a variety of forms and is usually in the form of sheet, film, container such as tube and tray or the like usually having a thickness of 5 mm or less, preferably 3 mm or less. A thickness of the preform for heat treatment before heat treatment exceeding 5 mm sometimes causes white turbid with the progress of internal crystallization at the time of forming the preform for heat treatment. The crystallinity of the preform for heat treatment is 20% or less, preferably 15% or less. A crystallinity thereof exceeding 20% results in insufficient transparency of the styrenic resin molding after heat treatment.

The styrenic resin molding according to the present invention can be obtained by heat treating the above-mentioned preform for heat treatment at a temperature in the range of 140 ° to 180° C., preferably 150 ° to 170° C. A heat treatment temperature lower than 140° C. leads to insufficient heat resistance sometimes causing white turbidity, while that exceeding 180° C. results in insufficient transparency. Heat treatment time is usually 1 second to 30 minutes, preferably 1 second to 10 minutes. The temperature rise rate during heat treatment is desirably such that the temperature of the preform for heat treatment is rapidly raised to the prescribed heat treatment temperature and from the above-mentioned viewpoint, is 30° C./minute or more, preferably 50° C./minute or more. A temperature rise rate less than 30° C./minute signifies the heat treatment at a temperature lower than the prescribed heat treatment temperature, sometimes deteriorating the transparency of the styrenic resin molding to be produced. The heating method for heat treatment is not specifically limited provided that the preform is brought into contact with a heating medium such as gas, liquid, metal or the like at 120° to 200° C. In addition, the styrenic resin molding which has been heat treated under the aforesaid conditions may be heat treated again if required under the suitable conditions including a temperature ranging from the glass transition temperature of the preform to the melt point thereof or lower and a heat treatment time of 1 second or more. The styrenic resin molding subjected to repeated heat treatment is not expected to be improved in crystallinity but can be improved in heat distortion temperature without impairment in transparency. The styrenic resin molding thus obtained is excellent in heat resistance, transparency and chemical resistance, especially thermal shrinkage, which is remarkably lower than that of the oriented film ever known and therefore is particularly well suited to the application requiring dimentional stability.

The aforesaid styrenic resin molding (hereinafter, abbreviated to "non-oriented molding") can be formed into a styrenic resin molding further excellent in transparency by thermoforming or orienting according to the present invention at an expansion ratio by area of 1,2 or more.

As the forming method, mention can be made of thermoforming method in which the non-oriented molding is heated and formed under vacuum and/or pressure of compressed air. The heating may be carried out either on one side or on both sides of the object or by bringing the object into direct contact with a heat source. In this case, a heating temperature lower than 120° C. sometimes results in failure to form uniformly, whereas that exceeding 260° C. causes insufficient transparency. The thermoforming method is not specifically limited but is exemplified by simple vacuum forming method, drape forming method, matched die method, pressure-bubble plug assist vacuum forming method, plug assist method, vacuum snap-back method, pressure-bubble vacuum snap-back method, air slip forming method, trapped sheet contact heating-pressure forming method and simple pressure forming method. The pressure at the time of forming is preferably 1 kg/cm$^2$ or less for vacuum forming method and 3 to 8 kg/cm$^2$ for pressure forming, and the combined method of vacuum forming and pressure forming may be applied thereto. It is preferable that the thermoforming die temperature be not higher than the aforestated heating temperature.

The expansion ratio at the time of thermoforming as expressed by the ratio of area of the deformed part after and before deformation due to thermoforming is 1,2 or more, preferably 1,5 to 6 in the present invention. An expansion ratio less than 1,2 causes insufficient strength in the deformed part, while an excessively great expansion ratio makes uniform forming difficult.

On the other hand, orientation is carried out by heating the non-oriented molding and orientation forming. As the method for orientation, any of uniaxial, simultaneous biaxial, consecutive biaxial and rolling is acceptable, exemplified by rolling with a nip roll, orientation between a plurality of nip rolls, orientation with a tenter. The orientation temperature is preferably in the range of 120° to 260° C., since the temperature lower than 120° C. will make uniform orientation impossible, whereas that exceeding 260° C. brings about insufficient transparency.

The draw ratio at the time of orientation forming is preferably not less than 1,2 and less than 15, since a draw ratio less than 1,2 results in insufficient effect on the improvement in dynamic and physical properties, while the ratio exceeding 15 tends to cause rupture during orientation.

Since as described hereinbefore, the styrenic resin molding according to the present invention has a high degree of crystallinity and is excellent in solvent resistance, heat resistance and transparency, it can be effectively utilized as heat-resisting transparent sheet, medical treatment container, microwave-range container, food package container such as hot packing container, oven container, retort container and the like, and heat-resisting transparent container such as heat-resisting bottle.

In the following, the present invention will be described in more detail with reference to reference example, preparation example, non-limitative examples and comparative examples.

Reference Example 1

In a 500 ml glass vessel which had been purged with argon were placed 17 g (71 mmol) of copper sulfate pentahydrate (CuSO$_4$ 5H$_2$O), 200 ml of toluene and 24 ml (250 mmol) of trimethylaluminum, which were then reacted at 40° C. for 8 hours. Then, the solids were separated from the reaction mixture to obtain 6.7 g of a contact product. The molecular weight thereof as determined by the freezing point depression method was 610.

Preparation Example 1

In a 2 L reaction vessel were placed 1 L of purified styrene, the contact product as obtained in the above Reference Example 1 in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 389,000 and a ratio of weight-average molecular weight to number-average molecular weight of 2.64.

It was confirmed that the polymer was SPS having a syndiotacticity of 97% from the results of melting point measurement and $^{13}$C-NMR analysis using carbon isotope.

Preparation Example 2

The procedure in Preparation Example 1 was repeated except that there were used as starting material monomers, 950 ml of purified styrene and 50 ml of p-methylstyrene to effect copolymerization.

It was confirmed from $^{13}$C-NMR analysis that the resultant copolymer was of cosyndiotactic configuration with 97% syndiotacticity and contained 9.5 mol % of p-methylstyrene unit. It had a weight-average molecular weight of 438,000 and a ratio of weight-average molecular weight to number-average molecular weight of 2.51.

Example 1

The powdery styrenic polymer obtained in the above Preparation Example 1 was subjected to vacuum drying with stirring at 150° C. for 2 hours. The dried powder was melt extruded with a single screw extruder equipped with a vent and a die with a plurality of capillaries at the end thereof, cooled and cut off to produce raw material for extrusion molding in the form of pellet. The above melt extrusion was carried out at a temperature of 300° C., extrusion rate of 30 kg/hr and vent pressure of 10 mmHg. Subsequently, the pellet was crystallized and dried in hot air with stirring. The dried pellet thus obtained had a residual styrene monomer content of 500 ppm and a crystallinity of 35%. Thereafter, the dried pellet was extruded at a extrusion temperature of 320° C., shear stress of $3 \times 10^5$ dyne/cm$^2$ by the use of an apparatus equipped with a T-die at the end of the single screw extruder to produce a melt extruded sheet.

The molten sheet thus obtained was placed closely in contact with a metallic cooling roll adjusted to 70° C. at a cooling rate of 70° C./sec to produce a preform (sheet) for heat treatment having a thickness of 150 μm and a crystallinity of 13%. The preform for heat treatment thus obtained was heat-treated at 155° C. for 10 minutes at a temperature rise rate of 200° C./min in an oven. The resultant styrenic resin molding had a crystallinity of 43%, a haze of 0.8% a spherulite radius of 1.4 μm and $|\Delta n|$ of $5.1 \times 10^{-3}$ showing a low degree of orientation. Moreover, thermal mechanical analysis (TMA) was applied to the styrenic resin molding to determine the temperature at which the molding was deformed by 2% over the length thereof. The result was 175°C.

Example 2

The procedure in Example 1 was repeated except that there was used a preform for heat treatment having 400 μm thickness prepared by adjusting the extrusion rate and degree of lip opening and that the temperature rise rate in heat treatment was altered to prepare a styrenic resin molding and measure the physical properties thereof. The results obtained are given in Table 1.

Example 3

The styrenic resin molding produced in Example 2 was heat treated again at 240° C. for 10 seconds and the resultant reheated molding was measured for physical properties. The results obtained are given in Table 1.

Example 4

The procedure in Example 1 was repeated except that there was used a preform for heat treatment (sheet) having 1000 μm thickness prepared from the styrenic polymer produced in Preparation Example 2 and by adjusting the extrusion rate and degree of lip opening and that the temperature rise rate in heat treatment was altered to prepare a styrenic resin molding and measure the physical properties thereof. The results obtained are given in Table 1.

Example 5

The procedure in Example 1 was repeated except that there was used a preform for heat treatment (sheet) having 2500 μm thickness prepared from the styrenic polymer produced in Preparation Example 2 and by adjusting the extrusion rate and degree of lip opening and that the temperature rise rate in heat treatment was altered to prepare a styrenic resin molding and measure the physical properties thereof. The results obtained are given in Table 1.

Example 6

The procedure in Example 1 was repeated except that the heat treatment temperature was set at 165° C. to prepare a styrenic resin molding (sheet) and measure the physical properties thereof. The results obtained are given in Table 1.

Comparative Example 1

The procedure in Example 1 was repeated except that heat treatment was omitted. The physical properties of the preform are given in Table 1.

Comparative Example 2

The procedure in Example 1 was repeated except that heat treatment temperature was set at 250° C. and the temperature rise rate in heat treatment was altered to prepare a styrenic resin molding and measure the physical properties thereof. The results obtained are given in Table 1.

Comparative Example 3

The procedure in Example 1 was repeated except that heat treatment temperature was set at 130° C. to prepare a styrenic resin molding and measure the physical properties thereof. The results obtained are given in Table 1.

Comparative Example 4

The procedure in Example 1 was repeated except that air gap was provided during the preparation of the styrenic resin molding and the temperature rise rate in heat treatment was altered to prepare the molding and measure the physical properties thereof. The results are given in Table 1.

TABLE 1

|  | Crystallinity of preform for heat treatment (%) | Heat treatment | | Preform | | | | | |
|---|---|---|---|---|---|---|---|---|---|
|  |  | Temperature (°C.) | Temperature rise rate (°C./min) | Thickness (μm) | Haze (%) | Crystallinity (%) | Spherulite radius (μm) | $|\Delta n|$ | Heat resistance (°C.) |
| Example 1 | 13 | 155 | 200 | 150 | 0.8 | 43 | 1.4 | $5.1 \times 10^{-3}$ | 175 |
| Example 2 | 15 | 155 | 180 | 400 | 1.2 | 44 | 1.5 | $5.5 \times 10^{-3}$ | 181 |
| Example 3 | 15 | 155 | 180 | 400 | 1.3 | 45 | 1.5 | $5.5 \times 10^{-3}$ | 252 |
| Example 4 | 8 | 155 | 130 | 1000 | 2.5 | 40 | 1.5 | $5.4 \times 10^{-3}$ | 183 |
| Example 5 | 11 | 155 | 90 | 2500 | 3.0 | 40 | 1.5 | $5.8 \times 10^{-3}$ | 185 |
| Example 6 | 15 | 165 | 200 | 150 | 1.0 | 42 | 1.6 | $5.2 \times 10^{-3}$ | 187 |
| Comparative Example 1 | 15 | — | — | 400 | 0.7 | 13 | — | $5.0 \times 10^{-3}$ | 97 |
| Comparative Example 2 | 15 | 250 | 160 | 400 | 31 | 42 | 1.7 | $5.1 \times 10^{-3}$ | 249 |
| Comparative Example 3 | 15 | 130 | 200 | 400 | 27 | 39 | 1.3 | $6.0 \times 10^{-3}$ | 144 |
| Comparative Example 4 | 30 | 155 | 180 | 400 | 19 | 45 | 1.6 | $5.1 \times 10^{-3}$ | 173 |

Example 7

The powdery styrenic polymer obtained in the above Preparation Example 1 was subjected to vacuum drying with stirring at 150° C. for 2 hours. The dried powder was melt extruded with a single screw extruder equipped with a vent and a die with a plurality of capillaries at the end thereof, cooled and cut off to produce raw material for extrusion molding in the form of pellet. The above melt extrusion was carried out at a melt temperature of 300° C., extrusion rate of 30 kg/hr and vent pressure of 10 mmHg. Subsequently, the pellet was crystallized and dried in hot air with stirring. The dried pellet thus obtained had a residual styrene monomer content of 1100 ppm and a crystallinity of 35%. Thereafter, the dried pellet was extruded at a extrusion temperature of 320° C., shear stress of $3 \times 10^5$ dyne/cm$^2$ by the use of an apparatus equipped with a T-die at the end of the single screw extruder to produce a melt extruded sheet.

The molten sheet thus obtained was placed closely in contact with a metallic cooling roll adjusted to 70° C. at a cooling rate of 70° C./sec to produce a preform (sheet) for heat treatment having a thickness of 600 μm and a crystallinity of 13%. The preform for heat treatment thus obtained was heat-treated at 155° C. for 10 minutes at a temperature rise rate of 200° C./min in an oven. The resultant styrenic resin molding had a crystallinity of 38%, a haze of 1.2%, a spherulite radius of 1.4 μm and $|\Delta n|$ of $8.1 \times 10^{-3}$ showing a low degree of orientation.

The lowly oriented molding thus obtained was thermoformed at a heating temperature of 160° C. and an expansion ratio of 4 by means of vacuum pressure forming method to form a cup. Table 2 gives the result of measurement of physical properties for the cup at the side. The cup was filled in with a mixture of an edible oil and water in a ratio by volume of 1:1 and heated to a internal temperature of 160° C. As a result, the cup was completely free from distortion, surface roughening or the like.

Example 8

The procedure in Example 7 was repeated except that there was used the styrenic polymer obtained in Preparation Example 2 and the preform for heat treatment having 1500 μm thickness was heat-treated at 165° C. by means of plug assisted vacuum forming to prepare a tray. The results obtained are given in Table 2.

Example 9

The procedure in Example 7 was repeated except that there was used the styrenic polymer obtained in Preparation Example 2 and the preform was heat-treated at 180° C. and subjected to simultaneous biaxial orientation at a draw ratio of 4 by the use of a table tenter to prepare a molding in the form of sheet, which was then heat-treated at 250° C. for 30 seconds. As a result, the sheet remained unchanged with regard to transparency. The results obtained are given in Table 2.

Example 10

The procedure in Example 7 was repeated except that there was used the styrenic polymer obtained in Preparation Example 2 and the preform was heat-treated at 180° C. and oriented at a draw ratio of 2 by the use of a table tenter to prepare a molding. The results obtained are given in Table 2.

Example 11

The procedure in Example 7 was repeated except that there was used the styrenic polymer obtained in Preparation Example 2 and the preform was heat-treated at 180° C. and subjected to consecutive orientation in machine and transverse directions at a draw ratio of 2 by the use of a table tenter to prepare a molding. The results obtained are given in Table 2.

Comparative Example 5

The procedure in Example 7 was repeated except that the preform was heat-treated at 200° C. to prepare a molding. The results obtained are given in Table 2.

Comparative Example 6

The procedure in Example 7 was repeated except that heat treatment of the preform was omitted to prepare a molding. The results obtained are given in Table 2.

Comparative Example 7

The procedure in Example 9 was repeated except that the preform was heat treated at 200° C. to prepare a molding. The results obtained are given in Table 2.

Comparative Example 8

The procedure in Example 9 was repeated except that heat treatment of the preform was omitted to prepare a molding in the form of sheet. The results obtained are given in Table 2. The molding was heated at 250° C. for 30 seconds, and as a result, it was whitened and the haze thereof turned out to be 21.

Example 12 & 13

The styrenic polymer obtained in Preparation Example 2 was subjected to vacuum pressure forming at an expansion ratio by area of 6 to prepare a molding in the form of cup. The results obtained are given in Table 2.

Comparative Example 9

The biaxially oriented sheet obtained in the same manner as in Comparative Example 8 was subjected to vacuum pressure forming to prepare a molding in the form of cup. The results obtained are given in Table 2.

Comparative Example 10

A biaxially oriented sheet was obtained at draw ratios of $3 \times 3$ in the same manner as in Comparative Example 8 to prepare a molding in the form of sheet. An attempt was made to subject the sheet to vacuum forming in the same manner as in Example 7. As a result, a cup could not be prepared because of incapability of sufficient deformation.

TABLE 2

| | Preform | | | | Forming condition | | |
|---|---|---|---|---|---|---|---|
| | Crystallinity (%) | Haze (%) | Sperulite radius (μm) | $|\Delta n|$ | Method for forming | Expansion ratio by area | Temperature (°C.) |
| Example 7 | 38 | 1.2 | 1.4 | $6 \times 10^{-3}$ | A | 4 | 160 |
| Example 8 | 35 | 1.8 | 1.5 | $6 \times 10^{-3}$ | B | 4 | 170 |
| Example 9 | 35 | 1.8 | 1.5 | $6 \times 10^{-3}$ | C | 4 | 180 |

TABLE 2-continued

| | | | | | | | |
|---|---|---|---|---|---|---|---|
| Example 10 | 35 | 1.8 | 1.5 | $6 \times 10^{-3}$ | D | 2 | 180 |
| Example 11 | 35 | 1.8 | 1.5 | $6 \times 10^{-3}$ | E | 4 | 180 |
| Comparative Example 5 | 39 | 13 | 1.6 | — | A | 4 | 160 |
| Comparative Example 6 | 13 | 1.1 | — | $8 \times 10^{-3}$ | A | 4 | 160 |
| Comparative Example 7 | 39 | 13 | 1.6 | — | C | 4 | 180 |
| Comparative Example 8 | 13 | 1.4 | — | $6 \times 10^{-3}$ | C | 4 | 180 |
| Example 12 | 37 | 1.7 | 1.5 | $7 \times 10^{-3}$ | A | 6 | 180 |
| Example 13 | 38 | 1.9 | 1.5 | $6 \times 10^{-3}$ | A | 6 | 180 |
| Comparative Example 9 | 35 | 10.3 | — | $2 \times 10^{-2}$ | A | 4 | 180 |
| Comparative Example 10 | 38 | 2.0 | — | $3 \times 10^{-3}$ | A | 4 | 180 |

| | | | | Molding | | |
|---|---|---|---|---|---|---|
| | | Thickness | Crystallinity | Haze(%) | | Test for heat and oil resistances |
| | Form | (μm) | (%) | oriented part | non-oriented part | |
| Example 7 | Cup | 150 | 45 | 1.9 | 2.1 | o |
| Example 8 | Tray | 380 | 42 | 2.2 | 2.5 | |
| Example 9 | Sheet | 380 | 43 | 1.9 | — | |
| Example 10 | Sheet | 750 | 39 | 2.1 | — | |
| Example 11 | Sheet | 370 | 45 | 2.0 | — | |
| Comparative Example 5 | Cup | 150 | 45 | 20 | 25 | |
| Comparative Example 6 | Cup | 150 | 38 | 7.8 | 11 | x |
| Comparative Example 7 | Sheet | 150 | 47 | 25 | — | — |
| Comparative Example 8 | Sheet | 150 | 35 | 9.1 | — | x |
| Example 12 | Cup | 150 | 40 | 1.7 | 2.2 | |
| Example 13 | Cup | 300 | 41 | 2.1 | 2.4 | |
| Comparative Example 9 | Cup | 40 | 40 | 18 | 21 | x |
| Comparative Example 10 | Not formable | | | — | — | — |

In the following are described the testing methods and conditions used for testing the above physical properties Haze: according to JIS K 7105

Crystallinity: A differential Scanning Calorimeter (DSC) was used to measure the endothermic enthalpy at the melting point measured under a difinite temperature rise rate (ΔHm) and the exothermic enthalpy at the cold crystallization temperature (ΔHcc) to determine the crystallinity (Xc) based on the fusion enthalpy at 100% crystallinity (Δ Hf:53 J/g). (Xc=(ΔHm−ΔHcc)/ΔHf).

Spherulite radius (R) : obtained from the locally maximum value of scattering angle (θm) as measured by crossed nicols by the use of a light-scattering measuring apparatus.

|Δn|: Retardation (γ) was measured with a polarizing microscope and a Berek compensator to determine birefringence |Δn|, which is the absolute value of birefringence in the direction of either thickness or plane inside.

Molding thickness: Minimum thickness after forming thereof.

Heat resistance: Thermal mechanical analysis (TMA) was applied to at molding to determined the temperature at which it was deformed by 2% over the length thereof.

Heat and oil resistances: Edible oil/water mixture (1:1 by volume) was placed in an oven, heated to 160° C. and used for the test.

Symbol o—Free from surface roughening, heat distortion and change in transparency.

x—Not meeting any of the aforementioned requirements

Method for forming

A—Vacuum pressure forming
B—Vacuum forming (plug assist method)
C—Simultaneous biaxial orientation
D—Uniaxial orientation
E—Consecutive biaxial orientation

What is claimed is

1. An orientable or thermoformable non-oriented styrenic resin molding which comprises a styrenic polymer having a high degree of syndiotactic configuration or a composition thereof, said molding having a crystallinity of 25% or more, wherein the upper limit of crystallinity is defined by requiring that the molding possess a spherulite radius of 10 μm or less and a haze of 5% or less.

2. The styrenic resin molding according to claim 1 wherein said molding is in the form of film, sheet or container each having a thickness of 5 mm or less.

3. A process for producing the styrenic resin molding as set forth in claim 1 which comprises subjecting a non-oriented preform for heat treatment having a crystallinity of 20% or less and comprising a styrenic polymer having a high degree of syndiotactic configuration or a composition thereof to heat treatment at a temperature in the range of 140° to 180° C.

4. The process according to claim 3 wherein said preform is formed by melting a styrenic polymer having a high degree of syndiotactic configuration or a composition thereof followed by cooling the same.

5. The process according to claim 3 wherein the heat treatment is effected by heating said preform to a heat treatment temperature at a temperature rise rate of 30° C. per minute or higher.

6. A process for producing a transparent styrenic resin molding having a crystallinity of 30% or more which comprises thermoforming or orienting a non-oriented styrenic resin molding having a crystallinity of 25% or more, wherein the upper limit of crystallinity is defined by requiring that the molding possess a spherulite radius of 10 $\mu$m or less and a haze of 5% or less and comprising a styrenic polymer having a high degree of syndiotactic configuration or a composition thereof at an expansion ratio by area of 1.2 or more at 120° to 260°C.

* * * * *